(12) United States Patent
Tohta

(10) Patent No.: US 9,920,796 B2
(45) Date of Patent: Mar. 20, 2018

(54) VEHICLE LOCK-UP CLUTCH CONTROL DEVICE

(71) Applicant: Nissan Motor Co., Ltd., Yokohama-shi, Kanagawa (JP)

(72) Inventor: Yuzuru Tohta, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/327,168

(22) PCT Filed: Aug. 29, 2014

(86) PCT No.: PCT/JP2014/072744
§ 371 (c)(1),
(2) Date: Jan. 18, 2017

(87) PCT Pub. No.: WO2016/031050
PCT Pub. Date: Mar. 3, 2016

(65) Prior Publication Data
US 2017/0175828 A1    Jun. 22, 2017

(51) Int. Cl.
| F16H 61/14 | (2006.01) |
| F16D 48/02 | (2006.01) |
| B60W 10/02 | (2006.01) |
| B60W 10/06 | (2006.01) |

(52) U.S. Cl.
CPC .............. *F16D 48/02* (2013.01); *F16H 61/14* (2013.01); *B60W 10/02* (2013.01); *B60W 10/06* (2013.01)

(58) Field of Classification Search
None
See application file for complete search history.

(56) References Cited

U.S. PATENT DOCUMENTS

| 5,314,050 A | 5/1994 | Slicker et al. | |
| 5,989,156 A * | 11/1999 | Matsubara | B60W 10/02 |
| | | | 477/169 |
| 6,039,675 A * | 3/2000 | Adachi | F16H 61/143 |
| | | | 477/169 |
| 8,996,265 B2 | 3/2015 | Kobayashi et al. | |
| 2004/0157705 A1 | 8/2004 | Nobumoto et al. | |
| 2005/0217957 A1* | 10/2005 | Imamura | F16H 61/143 |
| | | | 192/3.3 |
| 2014/0097057 A1 | 4/2014 | Fujikane et al. | |

FOREIGN PATENT DOCUMENTS

| CN | 102207195 A | 10/2011 |
| CN | 103391869 A | 11/2013 |
| JP | H05-270297 A | 10/1993 |
| JP | 2006-132627 A | 5/2006 |
| JP | 2011-202776 A | 10/2011 |
| JP | 2013-204766 A | 10/2013 |
| WO | 2012/095970 A1 | 7/2012 |

* cited by examiner

*Primary Examiner* — Justin Holmes
(74) *Attorney, Agent, or Firm* — Global IP Counselors, LLP

(57) ABSTRACT

A vehicle lock-up clutch control device is provided to suppress engine racing when a lock-up clutch is engaged at the time a vehicle starts moving. The vehicle lock-up clutch control device is provided with a control unit that delays the rise in lock-up command pressure if a line pressure, which is the source pressure of the actual lock-up oil pressure, is rising when the lock-up clutch is engaged at the time the vehicle starts moving. The control unit executes a torque reduction in the engine at least during the delay in the lock-up command pressure.

19 Claims, 7 Drawing Sheets

VEHICLE LOCK-UP CLUTCH CONTROL DEVICE

CROSS-REFERENCE TO RELATED APPLICATIONS

This application is a U.S. National stage application of International Application No. PCT/JP2014/072744, filed on Aug. 29, 2014.

BACKGROUND

Field of the Invention

The present invention relates to a lock-up clutch control device for a vehicle that engages a lock-up clutch of a torque converter at the time of starting to move.

Background Information

When engaging a lock-up clutch at the time of a vehicle starting to move, the line pressure of the actual lock-up oil pressure is not stabilized while the source pressure (line pressure) of the actual lock-up oil pressure is rising, and the following ability of the actual lock-up oil pressure to the lock-up command pressure is poor, so there is the possibility that shock occurs. Accordingly, a device is known in which the lock-up command pressure is delayed (maintains a constant value of the command pressure) when the line pressure is rising (for example refer to the Japanese Laid Open Patent Application No. 2011-202776).

SUMMARY

However, in a conventional device, when engaging the lock-up clutch at the time of starting to move, a lock-up capacity is not generated while a constant value is maintained by a command pressure delay. Consequently, there is the problem that the engine torque becomes excessively large during the lock-up command pressure delay, leading to an occurrence of engine racing.

In view of the problem described above, an object of the present invention is to provide a lock-up clutch control device of a vehicle that is capable of suppressing engine racing when engaging the lock-up clutch at the time of starting to move.

In order to achieve the above object, the present invention is provided with a vehicle lock-up clutch control device for a torque converter having a lock-up clutch between an engine and a transmission. The vehicle lock-up clutch control device is provided with an initial-motion lock-up control that delays the rise in the lock-up command pressure, if the source pressure of the actual lock-up oil pressure is rising when the lock-up clutch is engaged at the time of starting to move. The initial-motion lock-up control means executes a torque reduction in the engine, at least during the delay in the lock-up command pressure.

Therefore, if the source pressure of the actual lock-up oil pressure is rising when the lock-up clutch is engaged at the time of starting to move, a rise in the lock-up command pressure is delayed. Then, a torque reduction in the engine is executed, at least during the delay in the lock-up command pressure. That is, the engine torque is reduced and engine racing is suppressed by executing a torque reduction in the engine during a delay in the lock-up command pressure when a lock-up capacity is not generated. As a result, it is possible to suppress engine racing when the lock-up clutch is engaged at the time of starting to move.

DETAILED DESCRIPTION OF THE EMBODIMENTS

Figure 1:
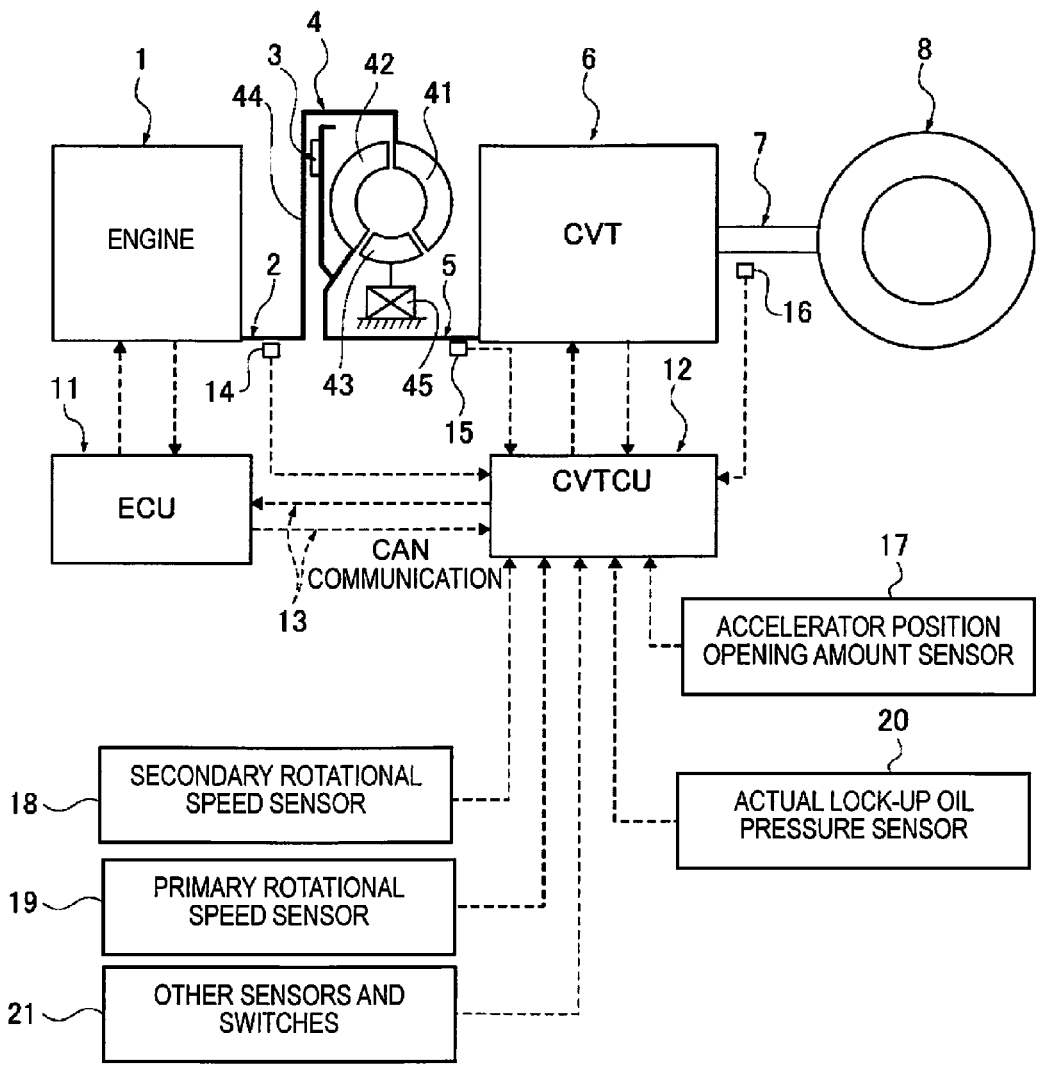
FIG. 1 is an overall system view illustrating an engine-equipped vehicle to which is applied the lock-up clutch control device of a first embodiment.

A preferred embodiment for realizing the lock-up clutch control device for a vehicle of the present invention is described below based on a first embodiment to a third embodiment illustrated in the drawings.

First Embodiment

The configuration is described first. The "Overall system configuration" and the "Initial-motion lock-up control configuration" will be separately described regarding the configuration of the lock-up clutch control device for a vehicle in the first embodiment.

Overall System Configuration

FIG. 1 illustrates an engine-equipped vehicle to which is applied a lock-up clutch control device of the first embodiment. The overall system configuration will be described below, based on FIG. 1.

As illustrated in FIG. 1, a vehicle drive system comprises an engine 1, an engine output shaft 2, a lock-up clutch 3, a torque converter 4, a transmission input shaft 5, a continuously variable transmission 6 (transmission), a drive shaft 7 and a drive wheel 8.

The lock-up clutch 3, built into the torque converter 4, couples the engine 1 and the transmission 6 via the torque converter 4 by releasing the clutch, and directly connects the engine output shaft 2 and the transmission input shaft 5 by engaging the clutch. The engagement/slip engagement/release of the lock-up clutch 3 is controlled by an actual lock-up oil pressure that is regulated based on the line pressure, which is the source pressure, when a lock-up command pressure is output from a CVT control unit 12, to be described later. The line pressure is produced by regulating, with a line pressure solenoid, the pressure of discharge oil from an oil pump, which is not shown, that is rotationally driven by the engine 1.

The torque converter 4 comprises a pump impeller 41, a turbine runner 42 that is disposed opposite to the pump impeller 41, and a stator 43 that is disposed between the pump impeller 41 and the turbine runner 42. This torque converter 4 is a fluid coupling that transmits torque by the hydraulic oil filled therein being circulated to each blade of the pump impeller 41, the turbine runner 42, and the stator 43. The pump impeller 41 is coupled to the engine output shaft 2 via a converter cover 44, the inner surface of which is the engagement surface of the lock-up clutch 3. The turbine runner 42 is coupled to the transmission input shaft 5. The stator 43 is provided on a stationary member (transmission case, etc.) via a one-way clutch 45.

The continuously variable transmission 6 is a belt-type, continuously variable transmission that continuously controls the transmission ratio by changing the belt contact diameters between a primary pulley and a secondary pulley, and the output rotation after shifting is transmitted to the drive wheels 8 via a drive shaft 7.

As illustrated in FIG. 1, the vehicle control system comprises an engine control unit 11 (ECU), a CVT control unit 12 (CVTCU) and a CAN communication line 13. An engine rotation sensor 14, a turbine rotation sensor 15 (i.e., CVT input rotation sensor), and a CVT output rotation sensor 16 (i.e., vehicle speed sensor) are provided as sensors for obtaining input information. Further provided are an accelerator position opening amount sensor 17, a secondary rotational speed sensor 18, a primary rotational speed sensor 19, an actual lock-up oil pressure sensor 20 and other sensors and switches 21.

The engine control unit 11 reduces the fuel injection amount to the engine 1 so as to obtain a torque reduction amount and a torque reduction profile that are based on the target slip rotational speed characteristic, when receiving an engine torque reduction control start signal from the CVT control unit 12 via the CAN communication line 13. Then, if an engine torque reduction control end signal is received from the CVT control unit 12 via the CAN communication line 13 during an engine torque reduction control, a normal fuel injection control corresponding to the driver-requested driving force is restored.

The CVT control unit 12 carries out a transmission control for controlling the transmission ratio of the continuously variable transmission 6, a line pressure control, a lock-up clutch control for switching between engagement/slip engagement/release of the lock-up clutch 3, and the like. Of this lock-up clutch control, in an initial-motion control by an accelerator depression, a lock-up engagement request for engaging the lock-up clutch 3 for the purpose of improving fuel efficiency is output. In this initial-motion lock-up control, the line pressure itself is not stabilized while the line pressure, which is the source pressure of the actual lock-up oil pressure, is rising; therefore, the lock-up command pressure is delayed (maintains a constant value of the command pressure) while the line pressure is rising. Then, the lock-up command pressure is raised after a delay time has elapsed. In addition, by executing an engine torque reduction control during a period that includes the command pressure delay, from the time of starting to move to when a lock-up capacity is generated, a cooperative control between an initial-motion lock-up engagement and an engine torque reduction is carried out.

Initial-Motion Lock-Up Control Configuration

Figure 2:
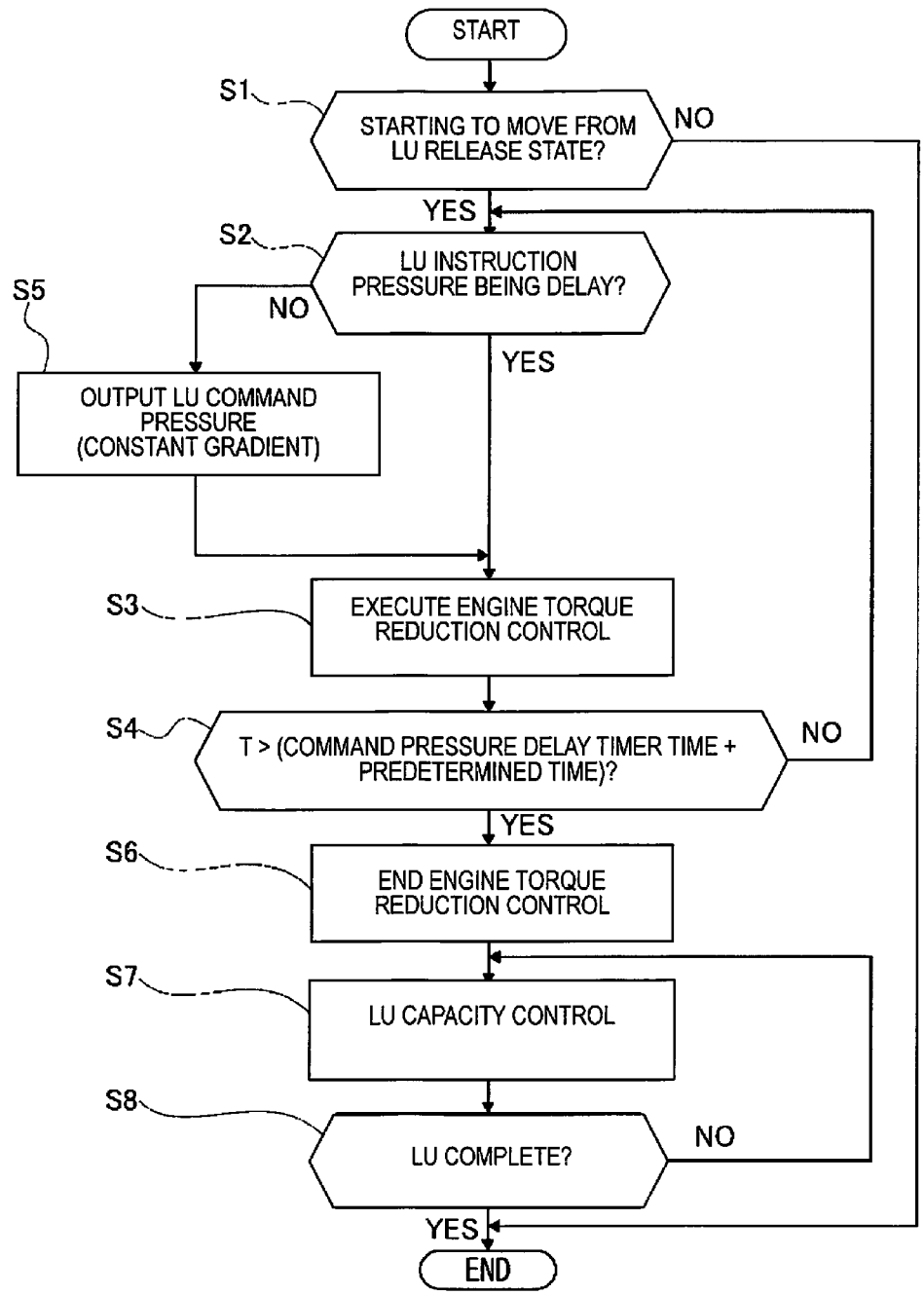
FIG. 2 is a flowchart illustrating the flow of the initial-motion lock-up control process that is executed in a CVT control unit of the first embodiment.

FIG. 2 illustrates the flow of the initial-motion lock-up control process that is executed by the CVT control unit 12 according to the first embodiment (initial-motion lock-up control means). Each step in FIG. 2 showing the configuration of the initial-motion lock-up control process will be described below. The description "LU" in FIG. 2 is an abbreviation for lock-up.

In Step S1, it is determined whether or not it is a time of starting to move by an accelerator depression operation from a lock-up release state in which the lock-up clutch 3 is released. If YES (time of starting), the process proceeds to Step S2, and if NO (other than time of starting), the process proceeds to END. Here, a determination that it is a time of starting to move by an accelerator depression operation is made by, for example, if the accelerator position opening amount obtained from the accelerator position opening amount sensor 17 has become higher than 0 degrees, after a foot is removed from the brake and a selection operation to a traveling range in a stopped state, have been confirmed. A timer count is started from accelerator on (accelerator position opening amount >0 degrees).

In Step S2, following the determination that it is a time of starting to move in Step S1, or the determination that T≤the command pressure delay timer time+predetermined time in Step S4, whether or not it is during a lock-up command pressure delay is determined. If YES (during a lock-up command pressure delay), the process proceeds to Step S3, and if NO (command pressure delay timer time has elapsed), the process proceeds to Step S5. Here, the determination that it is during a lock-up command pressure delay is determined by a timer counting time T, the counting of which is started from accelerator on, is less than or equal to a set command pressure delay timer time. This command pressure delay timer time is set based on multiple experimental data as a time that is required for the line pressure to rise and stabilize after the time of starting to move. In addition, the command pressure delay timer time may be provided as a fixed time, or may be provided as a variable time that changes depending on the transmission hydraulic oil temperature, etc., which is a factor that impacts the hydraulic response.

In Step S3, following the determination that it is during a lock-up command pressure delay in Step S2, or following a lock-up command pressure output in Step S5, an engine torque reduction control is executed and the process proceeds to Step S4. In the engine torque reduction control, the target slip rotational speed characteristic of the lock-up clutch 3 during the execution of the engine torque reduction control is set to a characteristic with which the target slip rotational speed from the time of starting to move is increased with a gradual gradient. Then, the torque reduction amount and the torque reduction profile of the engine 1 are subjected to feedback control such that the actual slip rotational speed (i.e., engine rotational speed−turbine rotational speed) follows the target slip rotational speed characteristic.

In Step S4, following the execution of the engine torque reduction control in Step S3, it is determined whether or not the timer counting time T has exceeded the command pressure delay timer time+predetermined time. If YES (T>command pressure delay timer time+predetermined time), the process proceeds to Step S6, and if NO (T≤command pressure delay timer time+predetermined time), the process returns to Step S2. Here, the predetermined time is set as a time that is required until a lock-up capacity generation timing after the command pressure delay timer time has elapsed, based on multiple experimental data.

In Step S5, following the determination that the command pressure delay timer time has elapsed in Step S2, a lock-up command pressure in a direction to engage the lock-up clutch 3 is output, and the process returns to Step S3. Here, the lock-up command pressure from after the command pressure delay timer time has elapsed until the engine torque reduction control is completed, is provided having a characteristic that gradually increases with a constant gradient. That is, the lock-up capacity control of the lock-up clutch 3 is configured to be an open control carried out with a predetermined ramp characteristic In Step S6, following the determination that T>command pressure delay timer time+predetermined time in Step S4, the engine torque reduction control ends and the process proceeds to Step S7. Here, if the engine torque reduction control ends, the engine 1 returns to a normal engine control by a fuel injection amount which aims for an engine torque that corresponds to the driver-requested driving force.

Figure 3:
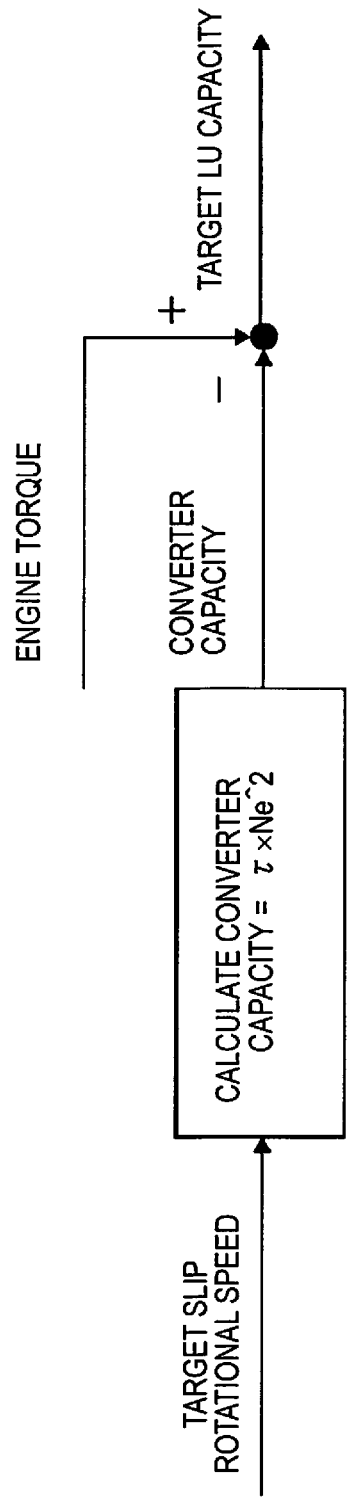
FIG. 3 is a block diagram illustrating the process of calculating a target lock-up capacity in a lock-up capacity control of the first embodiment.

In Step S7, following the end of the engine torque reduction control in Step S6, or the determination that lock-up is incomplete in Step S8, a lock-up capacity control of the lock-up clutch 3 is executed, and the process proceeds to Step S8. In this lock-up capacity control, the target slip rotational speed characteristic of the lock-up clutch 3 after the engine torque reduction control ends, is set to a characteristic with which the target slip rotational speed from the time of the end of control decreases with a gradual gradient. Then, the target lock-up command pressure to the lock-up clutch 3 is subjected to feedback control such that the actual slip rotational speed (i.e., engine rotational speed−turbine rotational speed) follows the target slip rotational speed characteristic. In this lock-up capacity control, when the actual slip rotational speed matches the target slip rotational speed, it is possible to obtain the target lock-up capacity by the difference between the engine torque and the converter capacity, as illustrated in FIG. 3. In FIG. 3, $\tau$ represents the torque converter capacity coefficient, Ne represents the engine rotational speed, and Ne$^2$ represents the square of the engine rotational speed Ne.

In Step S8, following the lock-up capacity control in Step S7, it is determined whether or not the engagement of the lock-up clutch 3 has been completed. If YES (lock-up complete), the process proceeds to END, and if NO (lock-up incomplete), the process returns to Step S7. Here, the completion of the engagement of the lock-up clutch 3 is determined by, for example, the actual slip rotational speed becoming zero or a value near zero.

Next, the actions are described. "Action of the initial-motion lock-up control according to a comparative example," "Action of the initial-motion lock-up control process," and "Action of the initial-motion lock-up control according to the first embodiment" will be separately described regarding the actions of the lock-up clutch control device according to the first embodiment.

Action of the Initial-Motion Lock-Up Control According to a Comparative Example

Figure 4:
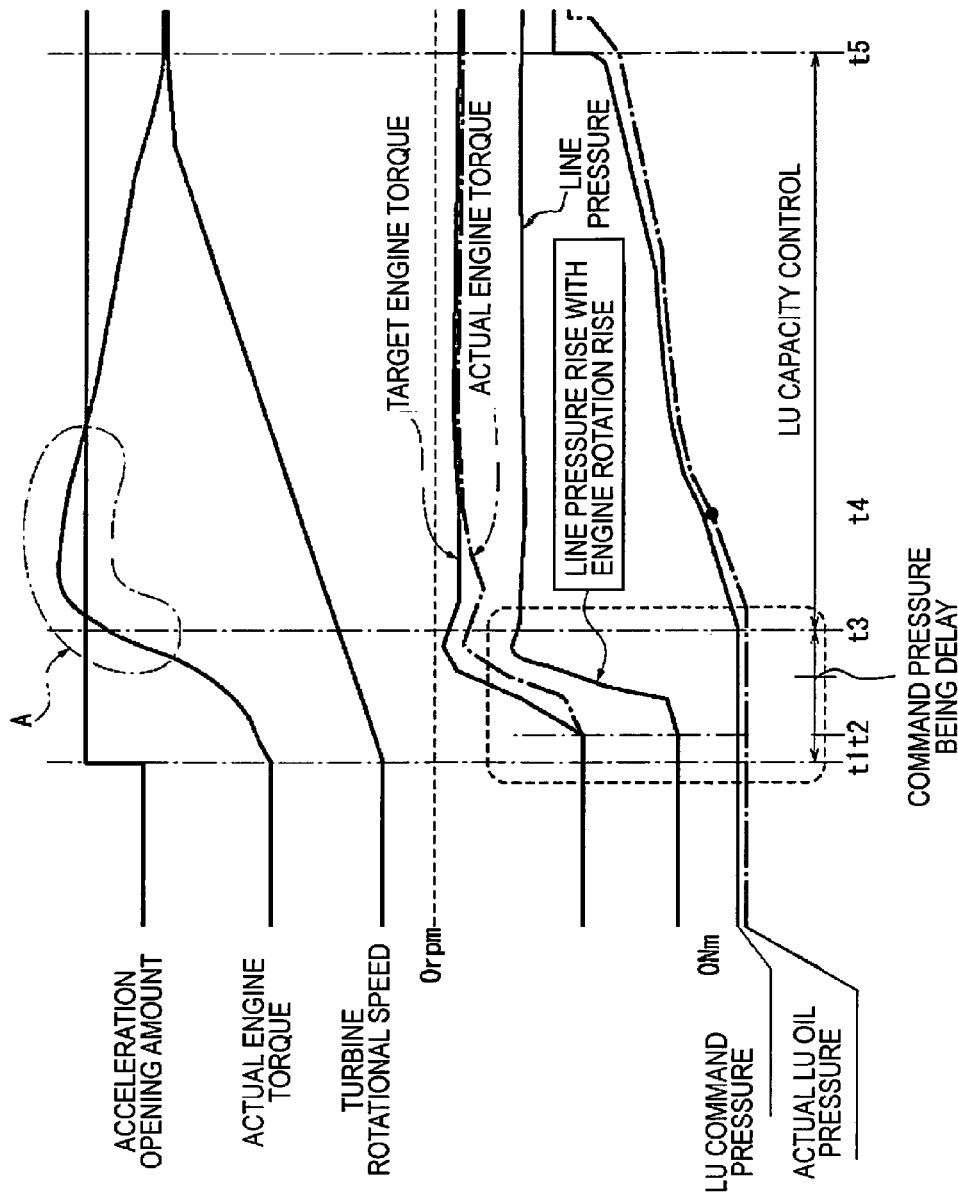
FIG. 4 is a time chart illustrating the respective characteristics of the accelerator position opening amount/actual engine rotational speed/turbine rotational speed/target engine torque/actual engine torque/line pressure/lock-up command pressure/actual lock-up oil pressure, when starting by a delay control of the lock-up command pressure in a comparative example.

The action of the initial-motion lock-up control according to a comparative example will be described below with the time chart illustrated in FIG. 4. In FIG. 4, time t1 is the accelerator depression time, time t2 is the rise start time of the engine torque and the line pressure, time t3 is the command pressure delay end time, time t4 is the lock-up capacity generation time, and time t5 is the lock-up engagement completion time.

When engaging the lock-up clutch at the time of starting to move, the line pressure, which is the source pressure of the actual lock-up oil pressure, rises with the rise in the actual engine rotational speed. The line pressure is not stabilized while the line pressure is rising, and the following ability of the actual lock-up oil pressure to the lock-up command pressure is poor, so there is the possibility that shock will occur. Accordingly, the lock-up command pressure is delayed when the line pressure is rising.

Therefore, when engaging the lock-up clutch at the time of starting to move by an accelerator depression operation, the command pressure is delayed from time t1 to time t3, during which a lock-up capacity is not generated (lock-up capacity <0 Nm). In this manner, if a lock-up capacity, which becomes a load on the engine, is not generated, the engine torque becomes excessively large, and the actual engine rotational speed races, as illustrated in area A of FIG. 4. If the actual engine rotational speed races, the lock-up engagement completion time t5, which is achieved by reducing the raised actual engine rotational speed to match the turbine rotational speed, is delayed, which leads to a deterioration of the fuel efficiency by an amount that corresponds to the delay in the lock-up engagement completion.

Action of the Initial-Motion Lock-Up Control Process

The action of the initial-motion lock-up control process according to the first embodiment will be described below based on the flowchart illustrated in FIG. 2.

At the time of starting to move by an accelerator depression operation from a lock-up release state in which the lock-up state 3 is released, the process proceeds from Step S1→Step S2→Step S3→Step S4 in the flowchart of FIG. 2. Then, while it is being determined that T≤command pressure delay timer time+predetermined time in Step S4, the flow that proceeds from Step S2→Step S3→Step S4 is repeated. That is, at the time of starting to move, a lock-up command pressure delay is carried out, and following the determination that it is during a lock-up command pressure delay in Step S2, an engine torque reduction control is executed in Step S3. In this engine torque reduction control, the target slip rotational speed characteristic of the lock-up clutch 3 during the execution of a torque reduction control is set to a characteristic with which the target slip rotational speed from the time of starting to move increases with a gradual gradient. Then, the torque reduction amount and the torque reduction profile of the engine 1 are subjected to feedback control such that the actual slip rotational speed follows the target slip rotational speed characteristic.

Then, while it is being determined that T≤command pressure delay timer time+predetermined time in Step S4, although the command pressure delay timer time has elapsed, the flow that proceeds from Step S2→Step S5→Step S3→Step S4 is repeated, in the flowchart of FIG. 2. That is, during the time that is outside of the command pressure delay period, but a lock-up capacity has yet to be generated, a lock-up command pressure according to a constant gradient for engaging the lock-up clutch 3 is output in Step S5.

Thereafter, when it is determined that T>command pressure delay timer time+predetermined time in Step S4 and that a time condition has been met, the process proceeds from Step S4 to Step S6→Step S7→Step S8 in the flowchart of FIG. 2. Then, while it is being determined that lock-up is incomplete in Step S8, the flow that proceeds from Step S7→Step S8 is repeated. That is, when it is determined that it is a lock-up capacity generation timing by the establishment of the time condition in Step S4, the engine torque reduction control ends in Step S6, and in the subsequent Step S7, a lock-up capacity control of the lock-up clutch 3 is executed. In this lock-up capacity control, the target slip rotational speed characteristic of the lock-up clutch 3 after the engine torque reduction control ends, is set to a characteristic with which the target slip rotational speed from the time of the end of control decreases with a gradual gradient. Then, the target lock-up command pressure to the lock-up clutch 3 is subjected to feedback control such that the actual slip rotational speed follows the target slip rotational speed characteristic. When it is determined that the lock-up is complete in Step S8 by executing the lock-up capacity control, the process proceeds to END.

Action of the Initial-Motion Lock-Up Control According to the First Embodiment

Figure 5:
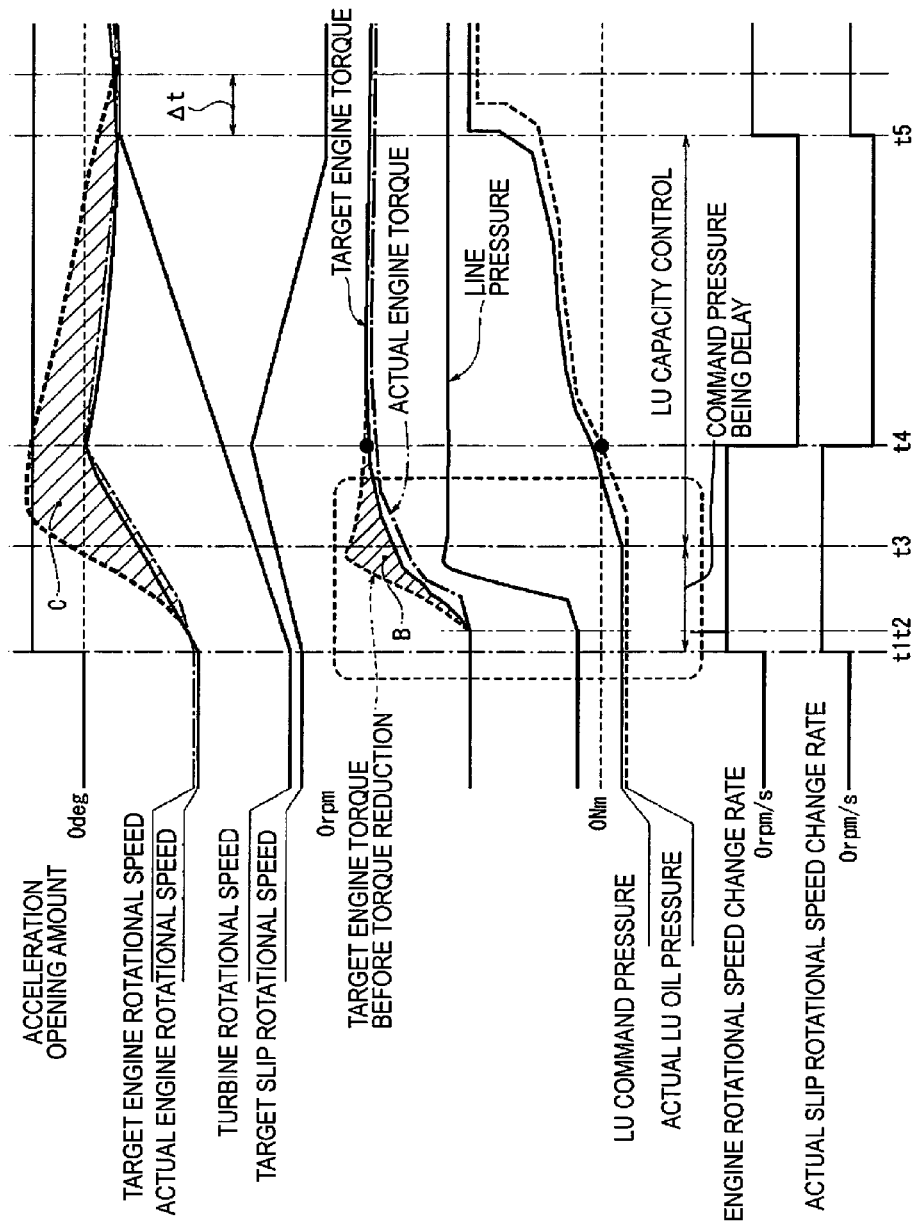
FIG. 5 is a time chart illustrating the respective characteristics of the accelerator position opening amount/target engine rotational speed/actual engine rotational speed/turbine rotational speed/target slip rotational speed/target engine torque/actual engine torque/line pressure/lock-up command pressure/actual lock-up oil pressure, when starting by a cooperative control between a command pressure delay and an engine torque reduction, in the first embodiment.

The action of the initial-motion lock-up control according to the first embodiment will be described below based on the time chart illustrated in FIG. 5. In FIG. 5, time t1 is the accelerator depression time, time t2 is the rise start time of the engine torque and the line pressure, time t3 is the command pressure delay end time, time t4 is the lock-up capacity generation time, and time t5 is the lock-up engagement completion time.

When engaging the lock-up clutch at the time of starting to move by an accelerator depression operation, the command pressure is delayed from start time t1 to command pressure delay end time t3, during which a lock-up capacity is not generated (lock-up capacity <0 Nm). However, the target slip rotational speed characteristic of the lock-up clutch 3 during the execution of the engine torque reduction control from starting time t1 to the lock-up capacity generation time t4, is set to a characteristic with which the target slip rotational speed from the time of starting to move increases with a gradual gradient. Then, an engine torque reduction control that suppresses the increase gradient of the engine rotational speed (B in FIG. 5 is the torque reduction region with respect to the comparative example) is executed such that the actual slip rotational speed follows the target slip rotational speed characteristic. In other words, the slip rotational speed of the lock-up clutch 3 is controlled by the engine torque reduction control, from start time t1 to time t4 at which time a lock-up capacity is generated. Since the engine torque is reduced by the engine torque reduction control in this manner, racing of the engine 1 is suppressed (C in FIG. 5 is the engine racing suppression region with respect to the comparative example).

The target slip rotational speed characteristic of the lock-up clutch 3 after the engine torque reduction control ends, from the lock-up capacity generation time t4 to the lock-up engagement completion time t5, is set to a characteristic with which the target slip rotational speed from the time of the end of control decreases with a gradual gradient. Then, the target lock-up command pressure to the lock-up clutch 3 is subjected to feedback control such that the actual slip rotational speed follows the target slip rotational speed characteristic. In other words, the slip rotational speed of the lock-up clutch 3 is controlled by the engine torque and lock-up capacity control, from the lock-up capacity generation time t4 to the lock-up engagement completion time t5. Since an increase in the engine 1 rotational speed caused by racing is suppressed and the engagement control of the lock-up clutch 3 along the target slip rotational speed proceeds in this manner, it is possible to put the lock-up clutch 3 in an engagement completed state at an early stage (shortened time $\Delta t$ with respect to the comparative example).

As described above, the first embodiment is configured such that, if the line pressure, which is the source pressure of the actual lock-up oil pressure, is rising when the lock-up clutch 3 is engaged at the time of starting to move, a rise in the lock-up command pressure is delayed. Then, a torque reduction in the engine 1 is executed, at least during the delay in lock-up command pressure. That is, the engine torque is reduced and engine racing is suppressed by executing a torque reduction in the engine 1 during a delay in lock-up command pressure when a lock-up capacity is not generated. As a result, it is possible to suppress engine 1 racing when the lock-up clutch 3 is engaged at the time of starting to move.

The first embodiment was configured to execute a torque reduction in the engine 1 from the time of starting to move until the lock-up clutch 3 generates a lock-up capacity. That is, when suppressing an engine 1 racing by a torque reduction, if the execution of the engine torque reduction is ended at an early stage, there is the risk that racing cannot be sufficiently suppressed. On the other hand, if the execution of the engine torque reduction is ended late, there is the risk that the engine rotational speed decrease gradient increases, to generate a torque fluctuation when returning to a normal engine torque control. In contrast, torque reduction is executed until an appropriate timing at which the lock-up clutch 3 generates a lock-up capacity to become a load on the engine 1. It is possible to reliably suppress engine 1 racing by configuring the execution of the engine torque reduction until a lock-up capacity is generated in this manner.

In the first embodiment, the target slip rotational speed characteristic of the lock-up clutch 3 during the execution of the engine torque reduction control, is set to a characteristic with which the target slip rotational speed from the time of start increases with a gradual gradient. Then, it was configured such that the torque reduction amount and the torque reduction profile of the engine 1 are controlled such that the actual slip rotational speed follows the target slip rotational speed characteristic (S3 in FIG. 2). That is, if the torque reduction in the engine 1 is carried out by an open control that provides a predetermined torque reduction amount, there are cases in which the engine rotational speed is excessively suppressed, or the suppression in the engine rotational speed is insufficient. In contrast, an engine torque reduction control is carried out using a feedback control of the slip rotational speed, which is the difference in the rotational speed between the engine rotational speed and the turbine rotational speed. Accordingly, the rise characteristic of the engine rotational speed with respect to the rise characteristic of the turbine rotational speed (corresponding to the vehicle speed) at the time of start becomes a target characteristic that is defined by the target slip rotational speed characteristic, and engine racing is suppressed.

In the first embodiment, the target slip rotational speed characteristic of the lock-up clutch 3 after the engine torque reduction control is ended, is set to a characteristic with which the target slip rotational speed from the time of the end of control decreases with a gradual gradient. Then, it was configured such that the target lock-up command pressure to the lock-up clutch 3 is controlled such that the actual slip rotational speed follows the target slip rotational speed characteristic (S7 in FIG. 2). That is, if a lock-up capacity control is carried out by an open control that provides a lock-up command pressure with a predetermined characteristic, a lock-up engagement shock occurs if the characteristic gradient is set to a high-gradient aiming for early engagement. Conversely, if the characteristic gradient is set to a low-gradient aiming to suppress shock, the lock-up engagement completion time is delayed. In contrast, a lock-up capacity control is carried out using a feedback control of the slip rotational speed, which is the difference in the rotational speed between the engine rotational speed and the turbine rotational speed. Accordingly, the control becomes a control in which the engine rotational speed is converged with the turbine rotational speed along the target slip rotational speed characteristic, thereby achieving both a prevention of lock-up engagement shock, and an early completion of the lock-up engagement.

The first embodiment was configured such that the engine torque reduction control ends when a time condition is met, in which the timer counting time T, the counting of which is started from the time of starting to move, exceeds the time obtained by adding a predetermined time to the command pressure delay timer time (S4→S6 in FIG. 2). That is, in the initial-motion lock-up control, a command pressure delay until the line pressure is stabilized is employed, and a timer that is counted from the time of starting to move when carrying out the command pressure delay is used. Therefore, by utilizing an existing timer and providing a lock-up capacity generation timing by a time condition, the lock-up capacity generation timing is determined by a simple configuration with no additional arithmetic configuration, etc.

Next, the effects are described. In the lock-up clutch control device according to the first embodiment, the effects listed below can be obtained.

(1) In a vehicle provided with a torque converter 4 including a lock-up clutch 3 between an engine 1 and a transmission (continuously variable transmission 6), provided with; an initial-motion lock-up control means (FIG. 2) that, if a source pressure of an actual lock-up oil pressure is rising when the lock-up clutch 3 is engaged at a time of starting to move, delays a rise in lock-up command pressure, and the initial-motion lock-up control means (FIG. 2) executes a torque reduction in the engine 1 at least during the delay in lock-up command pressure. Accordingly, it is possible to suppress engine 1 racing when the lock-up clutch 3 is engaged at the time of starting to move. In addition, fuel efficiency can be improved by being able to engage the lock-up clutch at an early stage.

(2) The initial-motion lock-up control means (FIG. 2) executes a torque reduction in the engine 1 from the time of starting to move until the lock-up clutch 3 generates a lock-up capacity. Accordingly, in addition to the effect of (1), it is possible to reliably suppress the racing of engine 1 by executing torque reduction until the lock-up capacity generation timing, which is an appropriate timing.

(3) The initial-motion lock-up control means (FIG. 2) sets the target slip rotational speed characteristic of the lock-up clutch 3 during the execution of the engine torque reduction control, to a characteristic with which the target slip rotational speed from the time of starting to move increases with a gradual gradient, and controls a torque reduction amount and a torque reduction profile of the engine 1 such that the actual slip rotational speed follows the target slip rotational speed characteristic (S3). Accordingly, in addition to the effect of (1) or (2), it is possible to suppress engine racing by obtaining a target rise characteristic of the engine rotational speed, which is defined by a set characteristic of the target slip rotational speed, during the execution of the engine torque reduction control.

(4) The initial-motion lock-up control means (FIG. 2) sets the target slip rotational speed characteristic of the lock-up clutch 3 after the engine torque reduction control ends to a characteristic with which the target slip rotational speed from the time of the end of control decreases with a gradual gradient, and controls a target lock-up command pressure to the lock-up clutch 3 such that the actual slip rotational speed follows the target slip rotational speed characteristic (S7). Accordingly, in addition to the effects of (1) to (3), by the engine rotational speed being converged with the turbine rotational speed along a set characteristic of the target slip rotational speed after the engine torque reduction control is ended, it becomes possible to achieve both a prevention of lock-up engagement shock, and an early completion of the lock-up engagement.

(5) The initial-motion lock-up control means (FIG. 2) ends the engine torque reduction control when a time condition is met, in which a timer counting time, the counting of which is started from the time of starting to move, exceeds the time obtained by adding a predetermined time to the command pressure delay timer time (S4→S6). Accordingly, in addition to the effects of (1) to (4), it is possible to determine the lock-up capacity generation timing by a simple configuration that utilizes an existing timer used in the lock-up command pressure delay control.

Second Embodiment

The second embodiment is an example in which the lock-up capacity generation timing to end the engine torque reduction control is determined by a change rate condition.

Figure 6:
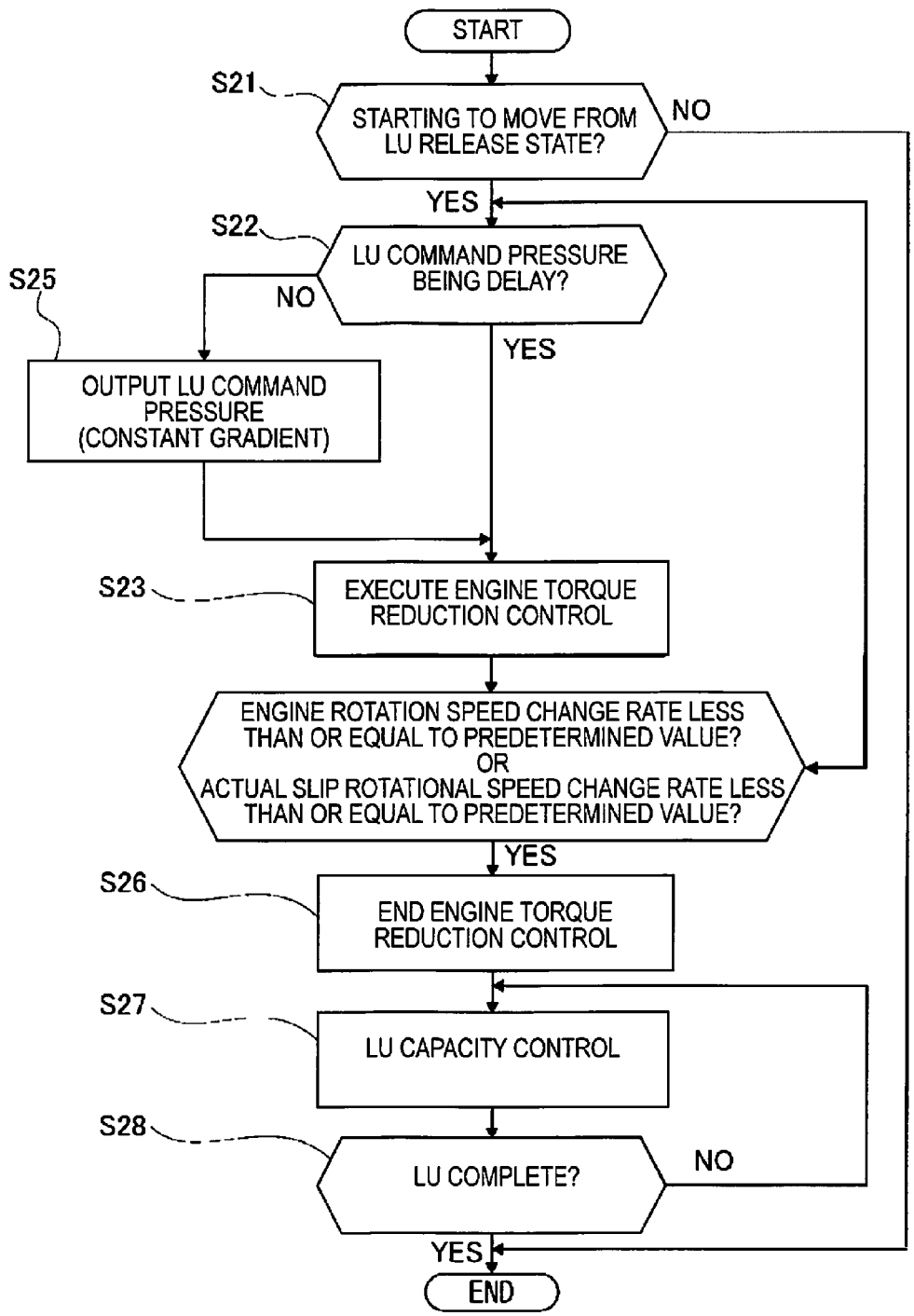
FIG. 6 is a flowchart illustrating the flow of the initial-motion lock-up control process that is executed in a CVT control unit of a second embodiment.

The configuration is described first. FIG. 6 illustrates the flow of the initial-motion lock-up control process that is executed by the CVT control unit 12 according to the second embodiment (initial-motion lock-up control means). Each step in FIG. 6 showing the configuration of the initial-motion lock-up control process will be described below. Since each of the steps of Step S21-Step S23 and Step S25-Step S28 are steps that carry out the same processes as each of the steps of Step S1-Step S3 and Step S5-Step S8 in FIG. 2, the descriptions thereof are omitted.

In Step S24, following the execution of the engine torque reduction control in Step S23, it is determined whether or not a change rate condition of either an engine rotational speed change rate being greater than or equal to a predetermined value, or an actual engine rotational speed change rate being greater than or equal to a predetermined value, is met. If YES (change rate condition met), the process proceeds to Step S26, and if NO (change rate condition not met), the process returns to Step S22. Here, the engine rotational speed change rate can be obtained by subjecting the engine rotational speed from the engine rotational speed sensor 14 to a time differentiation process. The actual slip rotational speed change rate is obtained by calculating the difference between the engine rotational speed from the engine rotational speed sensor 14 and the turbine rotational speed from the turbine rotation sensor 15 (i.e., actual slip rotational speed), and subjecting this actual slip rotational speed to a time differentiation process. The predetermined values of the engine rotational speed change rate and the actual slip rotational speed change rate are both set from the divergence between two values, when switching from a positive value on the acceleration side to a negative value on the deceleration side, before and after a lock-up capacity generation timing. The system configuration is the same as the first embodiment, so the illustrations and descriptions thereof are omitted.

Next, the actions are described. The second embodiment was configured to end the engine torque reduction control, when a change rate condition is met, in which either the engine rotational speed change rate or the actual engine rotational speed change rate is greater than or equal to a predetermined value. That is, by the engine rotational speed rising until a lock-up capacity is generated, the engine rotational speed change rate becomes on the acceleration side. In contrast, when a lock-up capacity is generated, the lock-up capacity becomes a load on the engine 1 and the engine rotational speed is reduced, thereby switching the engine rotational speed change rate to the deceleration side. That is, the engine rotational speed change rate switches from a positive value on the acceleration side to a negative value on the deceleration side before and after time t4, which is the lock-up capacity generation timing, as illustrated by the engine rotational speed change rate characteristic in FIG. 5. Similarly, the actual slip rotational speed change rate switches from a positive value on the acceleration side to a negative value on the deceleration side before and after time t4, which is the lock-up capacity generation timing, as illustrated by the actual slip rotational speed change rate characteristic in FIG. 5. Therefore, by using an engine rotational speed change rate condition or an actual slip rotational speed change rate condition, the actual timing at which a lock-up capacity is generated can be accurately determined. The other actions are the same as the first embodiment, so the descriptions thereof are omitted.

Next, the effects are described. In the lock-up clutch control device according to the second embodiment, the effects listed below can be obtained.

(6) The initial-motion lock-up control means (FIG. 6) ends the engine torque reduction control, when a change rate condition is met, in which either the engine rotational speed change rate or the actual engine rotational speed change rate is greater than or equal to a predetermined value (S24→S26). Accordingly, in addition to the effects of (1) to (4), the actual timing at which a lock-up capacity is generated can be accurately determined by using an engine rotational speed change rate condition or an actual slip rotational speed change rate condition.

Third Embodiment

The third embodiment is an example in which the lock-up capacity generation timing to end the engine torque reduction control is determined by a lock-up pressure condition.

Figure 7:
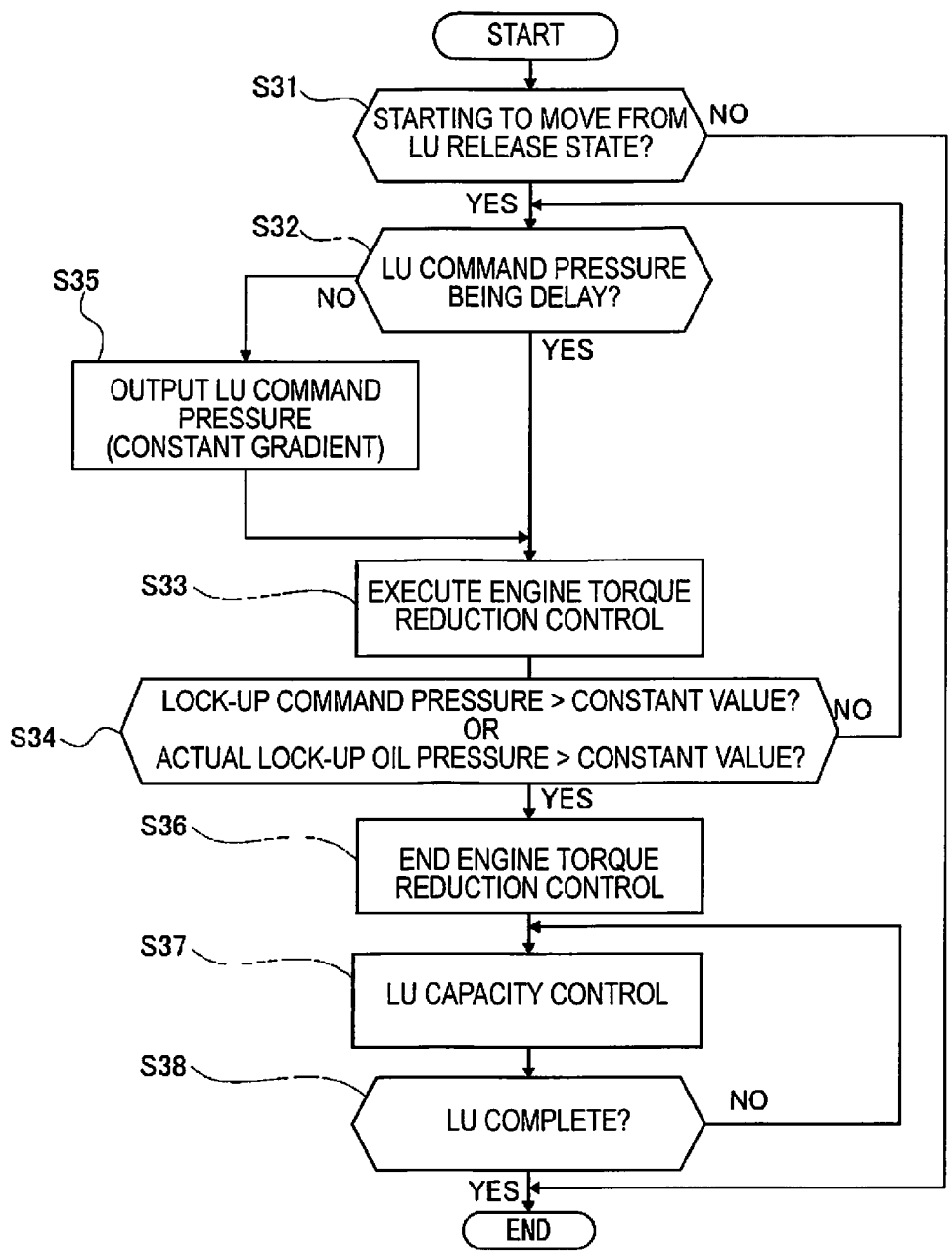
FIG. 7 is a flowchart illustrating the flow of the initial-motion lock-up control process that is executed in a CVT control unit of a third embodiment.

The configuration is described first. FIG. 7 illustrates the flow of the initial-motion lock-up control process that is executed by the CVT control unit 12 according to the third embodiment (initial-motion lock-up control means). Each step in FIG. 7 showing the configuration of the initial-motion lock-up control process will be described below. Since each of the steps of Step S31-Step S33 and Step S35-Step S38 are steps that carry out the same processes as each of the steps of Step S1-Step S3 and Step S5-Step S8 in FIG. 2, the descriptions thereof are omitted.

In Step S34, following the execution of the engine torque reduction control in Step S33, it is determined whether or not a lock-up pressure condition of either the lock-up command pressure exceeding a constant value, or the actual lock-up oil pressure exceeding a constant value, is met. If YES (lock-up pressure condition met), the process proceeds to Step S36, and if NO (lock-up pressure condition not met), the process returns to Step S32. Here, the lock-up command pressure is obtained by an arithmetic process by the CVT control unit 12. The actual lock-up oil pressure is obtained from the actual lock-up oil pressure sensor 20. The constant values of the lock-up command pressure and the actual lock-up oil pressure are set to values between 0 Nm-several Nm, by a lock-up capacity being generated when greater than or equal to 0 Nm. At this time, considering the response delay, the constant value of the lock-up command pressure and the constant value of the lock-up command pressure may be different values. The system configuration is the same as the first embodiment, so the illustrations and descriptions thereof are omitted.

Next, the actions are described. The third embodiment was configured to end the engine torque reduction control, when a lock-up pressure condition is met, in which either the command pressure or the actual hydraulic pressure of the lock-up clutch 3 exceeds a constant value. That is, at time t4, which is the lock-up capacity generation timing, the lock-up command pressure is slightly higher than 0 Nm, and the actual lock-up oil pressure becomes 0 Nm, as illustrated in the lock-up command pressure characteristic and the actual lock-up oil pressure characteristic in FIG. 5. Therefore, it is possible to accurately determine the generation starting timing of the lock-up capacity, which precedes the actual generation of capacity, by using a lock-up command pressure condition or an actual lock-up oil pressure condition. The other actions are the same as the first embodiment, so the descriptions thereof are omitted.

Next, the effects are described. In the lock-up clutch control device according to the third embodiment, the effects listed below can be obtained.

(7) The initial-motion lock-up control means (FIG. 7) ends the engine torque reduction control, when a lock-up pressure condition is met, in which either the command pressure or the actual hydraulic pressure of the lock-up clutch 3 exceeds a constant value (S34→S36). Accordingly, in addition to the effects of (1) to (4), it is possible to accurately determine the generation start timing of the lock-up capacity, by using a lock-up command pressure condition or an actual lock-up oil pressure condition.

The lock-up clutch control device of the present invention was described above based on the first to the third embodiments, but specific configurations thereof are not limited to these embodiments, and various modifications and additions to the design can be made without departing from the scope of the invention according to each claim.

In the first to the third embodiments, preferred examples were shown in which a torque reduction in the engine 1 is executed from the time of starting to move until the lock-up clutch 3 generates a lock-up capacity, as the initial-motion lock-up control means. However, any initial-motion lock-up control means may be employed that executes a torque reduction in the engine at least during the delay in lock-up command pressure. For example, the initial-motion lock-up control means may be an example in which a torque reduction in the engine is executed until the delay in lock-up command pressure is ended, or an example in which a torque reduction in the engine is executed for an extended time of a predetermined length after the delay in lock-up command pressure is ended, regardless of the lock-up capacity generation timing.

In the first to the third embodiments, preferred examples were shown in which the torque reduction amount and the torque reduction profile of the engine 1 are controlled such that the actual slip rotational speed follows along the target slip rotational speed characteristic, as the engine torque reduction control. However, the engine torque reduction control may be an example in which the torque reduction amount and the torque reduction profile of the engine are controlled by, for example, an engine rotational speed control that causes the actual engine rotational speed to follow along a target engine rotational speed characteristic.

In the first to the third embodiments, preferred examples were shown in which the target lock-up command pressure to the lock-up clutch 3 is controlled such that the actual slip rotational speed follows along the target slip rotational speed characteristic, as the lock-up capacity control after the engine torque reduction control ends. However, the lock-up capacity control after the engine torque reduction control ends may be an example in which the target lock-up command pressure is controlled by, for example, an engine rotational speed control that causes the actual engine rotational speed to follow a target engine rotational speed characteristic.

As means to determine the lock-up capacity generation timing, an example was shown in which the lock-up capacity generation timing is determined by a time condition in the first embodiment, and an example was shown in which the lock-up capacity generation timing is determined by a change rate condition. In addition, an example was shown in which the lock-up capacity generation timing is determined by a lock-up pressure condition in the third embodiment. However, the means to determine the lock-up capacity generation timing may be an example in which these plurality of conditions are combined, and the lock-up capacity generation timing is determined when one of the plurality of conditions are met.

In the first to the third embodiments, examples were shown in which the lock-up clutch control device of the present invention is applied to an engine-equipped vehicle equipped with a continuously variable transmission. However, the lock-up clutch control device of the present invention may be applied to a hybrid vehicle, and the transmission may be a stepped transmission that carries out a stepped automatic shifting, as long as the vehicle is equipped with an engine as a drive source. In short, the lock-up clutch control device may be applied to any vehicle provided with a torque converter comprising a lock-up clutch between the engine and the transmission.

The invention claimed is:

1. A vehicle lock-up clutch control device for a vehicle provided with a torque converter having a lock-up clutch between an engine and a transmission, the vehicle lock-up clutch control device comprising:
   a control unit programmed to include
      an initial-motion lock-up control which delays a rise in the lock-up command pressure when a source pressure of an actual lock-up oil pressure is rising when the lock-up clutch is engaged at a time of the vehicle starting to move, and
      the initial-motion lock-up control executes a torque reduction in the engine at least during the delay in the lock-up command pressure.

2. The vehicle lock-up clutch control device according to claim 1, wherein
   the control unit is further programmed such that the initial-motion lock-up control executes the torque reduction in the engine from the time of starting to move until the lock-up clutch generates a lock-up capacity.

3. The vehicle lock-up clutch control device according to claim 1, wherein
   the control unit is further programmed such that the initial-motion lock-up control sets a target slip rotational speed characteristic of the lock-up clutch during the execution of an engine torque reduction control, to a condition with which a target slip rotational speed from the time of the vehicle starting to move increases with a prescribed gradient, and controls a torque reduction amount and a torque reduction profile of the engine such that an actual slip rotational speed follows the target slip rotational speed characteristic.

4. The vehicle lock-up clutch control device according to claim 1, wherein
   the control unit is further programmed such that the initial-motion lock-up control sets a target slip rotational speed characteristic of the lock-up clutch, after an engine torque reduction control ends, to a condition with which a target slip rotational speed from a time of the end of control decreases with a prescribed gradient, and controls a target lock-up command pressure to the lock-up clutch such that an actual slip rotational speed follows the target slip rotational speed characteristic.

5. The vehicle lock-up clutch control device according to claim 1, wherein
   the control unit is further programmed such that the initial-motion lock-up control means ends an engine torque reduction control when a time condition is met, in which a timer counting time, counting of which is started from the time of the vehicle starting to move, exceeds a time obtained by adding a predetermined time to a command pressure delay timer time.

6. The vehicle lock-up clutch control device according to claim 1, wherein
   the control unit is further programmed such that the initial-motion lock-up control ends an engine torque reduction control when a change rate condition is met, in which one of an engine rotational speed change rate and an actual engine rotational speed change rate is greater than or equal to a predetermined value.

7. The vehicle lock-up clutch control device according to claim 1, wherein
   the control unit is further programmed such that the initial-motion lock-up control ends an engine torque reduction control when a lock-up pressure condition is met, in which one of a command pressure and an actual hydraulic pressure of the lock-up clutch exceeds a constant value.

8. The vehicle lock-up clutch control device according to claim 2, wherein
   the control unit is further programmed such that the initial-motion lock-up control sets a target slip rotational speed characteristic of the lock-up clutch during the execution of an engine torque reduction control, to a condition with which a target slip rotational speed from the time of the vehicle starting to move increases with a prescribed gradient, and controls a torque reduction amount and a torque reduction profile of the engine such that an actual slip rotational speed follows the target slip rotational speed characteristic.

9. The vehicle lock-up clutch control device according to claim 2, wherein
   the control unit is further programmed such that the initial-motion lock-up control sets a target slip rotational speed characteristic of the lock-up clutch, after an engine torque reduction control ends, to a condition with which a target slip rotational speed from a time of the end of control decreases with a prescribed gradient, and controls a target lock-up command pressure to the lock-up clutch such that an actual slip rotational speed follows the target slip rotational speed characteristic.

10. The vehicle lock-up clutch control device according to claim 2, wherein
the control unit is further programmed such that the initial-motion lock-up control ends an engine torque reduction control when a time condition is met, in which a timer counting time, counting of which is started from the time of the vehicle starting to move, exceeds a time obtained by adding a predetermined time to a command pressure delay timer time.

11. The vehicle lock-up clutch control device according to claim 2, wherein
the control unit is further programmed such that the initial-motion lock-up control ends an engine torque reduction control when a change rate condition is met, in which one of an engine rotational speed change rate and an actual engine rotational speed change rate is greater than or equal to a predetermined value.

12. The vehicle lock-up clutch control device according to claim 3, wherein
the control unit is further programmed such that the initial-motion lock-up control ends the engine torque reduction control when a lock-up pressure condition is met, in which one of a command pressure and an actual hydraulic pressure of the lock-up clutch exceeds a constant value.

13. The vehicle lock-up clutch control device according to claim 3, wherein
the control unit is further programmed such that the initial-motion lock-up control sets the target slip rotational speed characteristic of the lock-up clutch, after the engine torque reduction control ends, to a condition with which the target slip rotational speed from a time of the end of control decreases with the prescribed gradient, and controls a target lock-up command pressure to the lock-up clutch such that the actual slip rotational speed follows the target slip rotational speed characteristic.

14. The vehicle lock-up clutch control device according to claim 3, wherein
the control unit is further programmed such that the initial-motion lock-up control ends the engine torque reduction control when a time condition is met, in which a timer counting time, counting of which is started from the time of the vehicle starting to move, exceeds a time obtained by adding a predetermined time to a command pressure delay timer time.

15. The vehicle lock-up clutch control device according to claim 3, wherein
the control unit is further programmed such that the initial-motion lock-up control ends the engine torque reduction control when a change rate condition is met, in which one of an engine rotational speed change rate and an actual engine rotational speed change rate is greater than or equal to a predetermined value.

16. The vehicle lock-up clutch control device according to claim 3, wherein
the control unit is further programmed such that the initial-motion lock-up control ends the engine torque reduction control when a lock-up pressure condition is met, in which one of a command pressure and an actual hydraulic pressure of the lock-up clutch exceeds a constant value.

17. The vehicle lock-up clutch control device according to claim 4, wherein
the control unit is further programmed such that the initial-motion lock-up control ends the engine torque reduction control when a time condition is met, in which a timer counting time, counting of which is started from the time of the vehicle starting to move, exceeds a time obtained by adding a predetermined time to a command pressure delay timer time.

18. The vehicle lock-up clutch control device according to claim 4, wherein
the control unit is further programmed such that the initial-motion lock-up control ends the engine torque reduction control when a change rate condition is met, in which one of an engine rotational speed change rate and an actual engine rotational speed change rate is greater than or equal to a predetermined value.

19. The vehicle lock-up clutch control device according to claim 4, wherein
the control unit is further programmed such that the initial-motion lock-up control ends the engine torque reduction control when a lock-up pressure condition is met, in which one of a command pressure and an actual hydraulic pressure of the lock-up clutch exceeds a constant value.

* * * * *